Figure 1A:
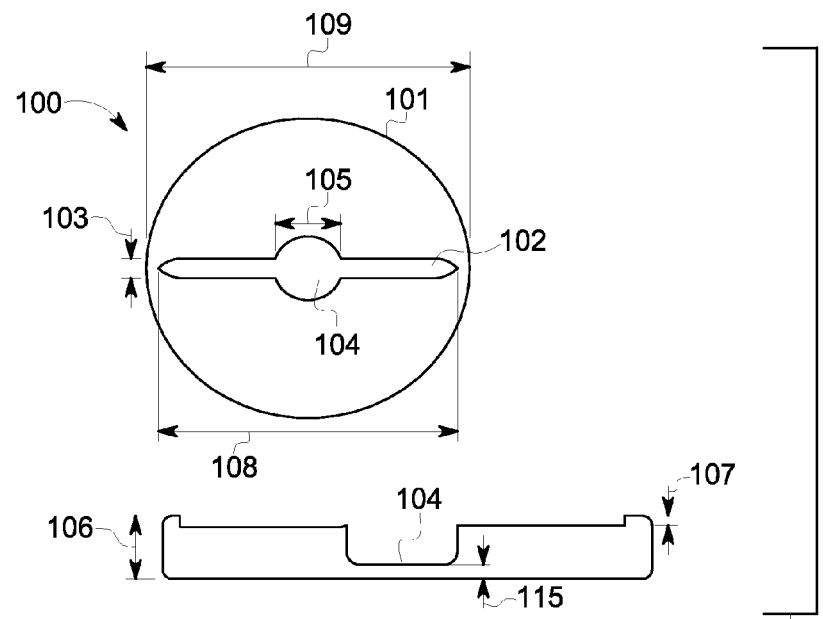

US009303330B2

(12) United States Patent
Sundararajan et al.

(10) Patent No.: US 9,303,330 B2
(45) Date of Patent: Apr. 5, 2016

(54) METHOD FOR MANUFACTURING FLUID HANDLING DISCS WITH POROUS MESH PLATES FOR USE IN ULTRASONIC MESH NEBULIZERS

(71) Applicant: General Electric Company, Schenectady, NY (US)

(72) Inventors: Guruprasad Sundararajan, Bangalore (IN); Marko Klaus Baller, Riegelsberg (DE); Swarnagowri Addepalli, Bangalore (IN); Satyanarayanan Seshadri, Bangalore (IN); Dinesh R. Rakwal, Bangalore (IN); Subhashish Dasgupta, Bangalore (IN); Heikki Haveri, Helsinki (FI)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/912,678

(22) Filed: Jun. 7, 2013

(65) Prior Publication Data

US 2014/0360886 A1 Dec. 11, 2014

(51) Int. Cl.

| | |
|---|---|
| *B23H 3/00* | (2006.01) |
| *B23H 9/14* | (2006.01) |
| *C25F 3/06* | (2006.01) |
| *B23H 9/00* | (2006.01) |
| *B23H 3/08* | (2006.01) |

(52) U.S. Cl.
CPC .. *C25F 3/06* (2013.01); *B23H 3/00* (2013.01); *B23H 9/00* (2013.01); *B23H 9/14* (2013.01); *B23H 3/08* (2013.01)

(58) Field of Classification Search
CPC .............. B23H 3/00–3/10; B23H 9/10; B23H 9/14–9/16; C25F 3/00–3/30
USPC .................................................. 205/640–686
See application file for complete search history.

(56) References Cited

U.S. PATENT DOCUMENTS

| | | | | |
|---|---|---|---|---|
| 3,816,272 | A * | 6/1974 | Joslin | 205/672 |
| 5,522,385 | A | 6/1996 | Lloyd et al. | |
| 5,904,830 | A * | 5/1999 | Yamao et al. | 205/640 |
| 6,070,575 | A | 6/2000 | Gonda et al. | |
| 6,362,446 | B1 * | 3/2002 | Jones et al. | 219/69.11 |
| 6,530,370 | B1 | 3/2003 | Heinonen | |
| 6,539,937 | B1 | 4/2003 | Haveri | |
| 6,629,646 | B1 | 10/2003 | Ivri | |

(Continued)

OTHER PUBLICATIONS

Dhand., "New Nebuliser Technology—Aerosol Generation by Using a Vibrating Mesh or Plate With Multiple Apertures", Business Briefing: Long Term Healthcare Strategies, pp. 1-4, 2003.

(Continued)

*Primary Examiner* — Nicholas A Smith
*Assistant Examiner* — Brian W Cohen
(74) *Attorney, Agent, or Firm* — Melissa K. Dobson

(57) ABSTRACT

The present disclosure relates to methods for manufacturing porous mesh plates for use in ultrasonic mesh nebulizers, and the porous mesh plates manufactured by those methods. Cone-shaped dimples are first drilled in a substrate (e.g. a plate), but do not penetrate the bottom of the substrate. Next, the substrate (e.g. a plate) is subject to an electrochemical process to remove a layer of material from the surface of the substrate. Enough material is removed to allow the dimples to penetrate the substrate, thereby creating holes in the substrate. The size of the holes can be controlled by the conditions of the electrochemical process.

26 Claims, 12 Drawing Sheets

(56) References Cited

U.S. PATENT DOCUMENTS

| | | |
|---|---|---|
| 6,769,626 B1 | 8/2004 | Haveri |
| 7,316,067 B2* | 1/2008 | Blakey .................. 29/896.6 |
| 7,748,382 B2 | 7/2010 | Denyer et al. |
| 7,883,031 B2 | 2/2011 | Collins et al. |
| 7,954,486 B2 | 6/2011 | Papania et al. |
| 2001/0045366 A1* | 11/2001 | Iwata et al. ................ 205/665 |
| 2003/0146300 A1 | 8/2003 | Denyer et al. |
| 2005/0045491 A1* | 3/2005 | Zhu et al. .................. 205/676 |
| 2005/0103330 A1* | 5/2005 | Anderson ............ 128/200.23 |
| 2005/0121543 A1* | 6/2005 | Sayar .................... 239/533.12 |
| 2008/0017520 A1* | 1/2008 | Koishikura et al. ......... 205/640 |
| 2011/0017608 A1* | 1/2011 | Taylor et al. ................ 205/666 |
| 2011/0120456 A1 | 5/2011 | Immel |
| 2011/0290663 A1* | 12/2011 | Luo et al. .................... 205/672 |

OTHER PUBLICATIONS

Wencheng., "Piezoelectric Transducers for Nebulizer Application", M.Phil, The Hong Kong Polytechnic University, Department of Applied Physics, pp. 1-155, Aug. 2006.

* cited by examiner

METHOD FOR MANUFACTURING FLUID HANDLING DISCS WITH POROUS MESH PLATES FOR USE IN ULTRASONIC MESH NEBULIZERS

TECHNICAL FIELD

The present disclosure relates to methods for manufacturing porous mesh plates for use in ultrasonic mesh nebulizers, as well as the porous mesh plates manufactured by those methods.

BACKGROUND

Finely atomized aerosols have found use in a number of applications in recent decades. For instance, respiratory ailments such as COPD, cystic fibrosis and asthma are often treated by inhaled aerosol therapy. Some advantages of inhaled aerosol therapy include the ability to effectively deliver a therapeutic agent directly to the site of need (e.g. the lungs) without high systemic exposure. Accordingly, devices for use in aerosol therapy (e.g. metered dose inhalers, or MDIs, dry powder inhalers, or DPIs, and nebulizers) have been used for the treatment of respiratory disease.

Ultrasonic mesh nebulizers operate by producing high-frequency ultrasonic waves, which create tiny, inhalable droplets from a liquid (e.g. a solution containing a therapeutic agent). The size of the droplets is important; ideally droplets range in size from 1-5 μm. Droplets that are too large (e.g. >5 μm in diameter) tend to be absorbed in the throat and mouth before reaching the lungs. Alternatively, droplets that are too small (e.g. <1 μm in diameter) tend to be exhaled without being absorbed in the lungs. Because the size of the aerosol droplets produced is dependent upon the diameter of holes in the mesh used in the ultrasonic mesh nebulizer, it is crucial that ultrasonic mesh nebulizers use a mesh in which the holes are of uniform and appropriate size (e.g. preferably less than 4 μm in diameter).

In some instances, ultrasonic mesh nebulizers have been used for the delivery of drugs to the lungs of infants in the context of neonatal care. In such cases, it is advantageous for the aerosolized particles to have uniform characteristics and to be of the appropriate size (e.g. preferably less than 4 μm in diameter).

Current manufacturing processes used to make porous mesh plates may use focused lasers, ions, or electron beams, or use lithography techniques to directly generate holes, or pores, of the desired size in a given substrate (e.g. a plate). These techniques can be costly because they often require the use of specialized drilling equipment and thin, delicate films in which the holes are drilled to form a mesh.

SUMMARY OF THE TECHNOLOGY

The present technology is directed to methods for manufacturing porous mesh plates for use in ultrasonic mesh nebulizers and other applications in which generation of aerosolized particles (e.g. droplets) is desirable. In some preferred embodiments, the methods allow the user to reliably generate holes of desired size in a thin plate to form a porous mesh. In some embodiments, the present technology is further directed to porous mesh plates manufactured by the method(s) described herein.

The present technology employs a two-step protocol, wherein dimples are first drilled into a plate or substrate (e.g. a fluid handling disc). The dimples do not penetrate the bottom surface of the plate or substrate (e.g. a fluid handling disc). In the second step, a layer of material is removed by an electrochemical process in order to generate holes in the plate or substrate (e.g. a fluid handling disc), thereby creating a porous mesh. The size of the holes can be controlled by the extent to which the electrochemical process is allowed to proceed.

In one aspect, the technology features a method for making fluid handling discs. The method comprises providing a fluid handling disc having a top surface and a bottom surface and drilling dimples in the top surface of the disc, such that the dimples do not penetrate the bottom surface of the disc. The method further comprises etching the disc via electrochemical etching to remove a layer of material from the bottom surface of the disc, such that removal of a layer of material from the bottom surface of the disc is sufficient to cause the dimples to penetrate the bottom surface of the disc, thereby creating holes in the disc, and such that the resulting fluid handling discs are suitable for aerosolizing a liquid.

In one or more embodiments, the method further includes etching the disc via electrochemical etching to remove a layer of material from the top surface of the disc. In one or more embodiments, the method includes making holes having a diameter of less than about 4 μm. In one or more embodiments, the method includes using a disc that has an initial height of between about 50 and 250 μm. In one or more embodiments, the method includes using a disc that is made of stainless steel. In one or more embodiments, the method includes using electrochemical etching that is carried out at constant current. In one or more embodiments, the method includes electrochemical etching that is carried out in a solution comprising phosphoric acid, sulfuric acid, and water. In one or more embodiments, the method includes electrochemical etching that is carried out in a solution comprising sodium chloride and sodium nitrate in a ratio of 1:50 to 50:1. In one or more embodiments, the method includes electrochemical etching that is carried out in a solution comprising sodium chloride. In one or more embodiments, the method includes electrochemical etching that is carried out in a solution comprising sodium nitrate.

In one or more embodiments, the electrochemical etching method provided above includes making dimples that are drilled with laser drilling. In one or more embodiments, the method includes making dimples that are drilled with ion/e-beam drilling. In one or more embodiments, the method includes making dimples that are conical. In one or more embodiments, the method includes removing a layer of material of about 0.5 μm to about 10 μm thick from the surface of the disc via electrochemical etching.

In another aspect, the technology provides method for making fluid handling discs. The method comprises providing a fluid handling disc having a top surface and a bottom surface and drilling dimples in the top surface of the handling disc, such that the dimples do not penetrate the bottom surface of the disc. The method further comprises machining the disc via electrochemical machining to remove a layer of material of material from the bottom surface of the disc, such that removal of a layer of material from the bottom surface of the disc is sufficient to cause the dimples to penetrate the bottom surface of the disc, thereby creating holes in the disc, and such that the resulting fluid handling discs are suitable for aerosolizing a liquid.

In one or more embodiments, the method further includes etching the disc via electrochemical etching to remove a layer of material from the top of the disc. In one or more embodiments, the method includes making holes that have a diameter of less than about 4 μm. In one or more embodiments, the method includes using a disc that has an initial height of between about 50 and 250 μm. In one or more embodiments, the method includes using a disc that is made of stainless steel. In one or more embodiments, the method includes using electrochemical etching that is carried out at constant current. In one or more embodiments, the method includes using electrochemical etching that is carried out in a solution comprising phosphoric acid, sulfuric acid, and water. In one or more embodiments, the method includes electrochemical etching that is carried out in a solution comprising sodium chloride and sodium nitrate in a ratio of 1:50 to 50:1. In one or more embodiments, the method includes electrochemical etching that is carried out in a solution comprising sodium chloride. In one or more embodiments, the method includes electrochemical etching that is carried out in a solution comprising sodium nitrate.

In one or more embodiments, the electrochemical machining method provided above includes making dimples that are drilled with laser drilling. In one or more embodiments, the method includes making dimples that are drilled with ion/e-beam drilling. In one or more embodiments, the method includes making dimples that are conical. In one or more embodiments, the method includes removing a layer of material of about 0.5 μm to about 10 μm microns thick from the surface of the disc via electrochemical etching.

In another aspect, the technology provides a fluid handling disc for aerosolizing a liquid, the disc comprising a porous mesh plate, made by any of the methods described above.

Given the above features, the advantages of this technology are numerous. For instance, in some embodiments the technology allows one to begin with a starting substrate (e.g. plate or fluid handling disc) that has a greater thickness (e.g. about 50-250 μm) than the thickness of the final porous mesh (e.g. about 20 μm). Accordingly, the starting substrate is stronger and more robust during the laser drilling process than are thinner substrates. Another advantage of this technology is that it allows the user a great deal of control over the size of pores made in the porous mesh. As such, in some embodiments it allows the user to generate pore sizes that are less than 4 μm in diameter. (e.g. less than 2.5 μm in diameter). Additionally, in some embodiments this technology automatically removes debris and metal oxides from the surface of the porous mesh plate via the electrochemical process, thereby enabling the generation of more-uniform sized holes. Accordingly, in some embodiments the technology enables the manufacture of porous mesh plates for use in ultrasonic nebulizers, as well as other applications that rely on generation of fine aerosols, that are durable and feature highly uniform hole size.

Additional applications of the current technology include the manufacture of porous mesh plates for use in neonatal nebulizers for the delivery of drugs to the lungs of infants. For neonatal nebulizers, it is advantageous to use porous mesh plates that are capable of generating aerosolized particles that are highly uniform, and that have a well-defined size (e.g. less than 4 μm in diameter).

BRIEF DESCRIPTION OF THE DRAWINGS

FIG. 1A shows a schematic of the membrane design.

FIG. 1B shows machined mesh plates made by electrochemical machining (ECM) after drilling with laser drilled holes. Channels for attaching fluid flow channels are visible.

FIG. 1C shows a representation of the process of making dimples in a substrate (e.g. a plate or disc) before an electrochemical process.

FIG. 2A shows a schematic of the electrochemical machining (ECM) process for mesh hole size control.

FIG. 2B shows a test cell for etching.

FIG. 2C shows a substrate (e.g. a plate) after the etching process.

FIG. 3 shows graphs of constant current etching for removing ~3 microns of surface oxide layer from the surface of a substrate by electrochemical etching.

FIG. 4A shows a 50 μm scale image of nebulizer substrate before etching.

FIG. 4B shows a 20 μm scale image of nebulizer substrate before etching.

FIG. 5A shows a 20 μm scale image of nebulizer substrate after etching.

FIG. 5B shows a close up 20 μm scale image of nebulizer substrate after etching.

FIG. 6A shows a substrate after 20 min electrochemical etching.

FIG. 6B shows a 100 μm scale image of a nebulizer substrate after etching.

FIG. 6C shows a galvanostatic scan of nebulizer stainless steel substrate in 55 wt % phosphoric acid, 14% sulfuric acid and water, at 20 mA/cm$^2$ current density at 25° C.

FIG. 7A shows an image of the top of a substrate before electrochemical etching.

FIG. 7B shows an image of the top of a substrate after electrochemical etching.

FIG. 7C shows an image of the bottom of a substrate before electrochemical etching.

FIG. 7D shows an image of the bottom of a substrate after electrochemical etching.

FIG. 8A shows a schematic of the electrochemical machining process.

FIG. 8B shows a different schematic of the electrochemical machining process.

FIG. 9 shows representative examples of the configuration and patterning of the holes on some embodiments of a mesh plate.

DETAILED DESCRIPTION

Methods for efficiently manufacturing porous mesh plates for use in ultrasonic nebulizers can reduce the cost of such nebulizers, and give patients greater access to high-quality nebulizers for treatment. The present technology offers a method of manufacturing porous mesh plates for use in ultrasonic mesh nebulizers. In some embodiments, a stainless steel plate may be used as a substrate for the porous mesh plate. Stainless steel has the advantage of being a cost-effective substrate, and it can be made in surgical grade, which is advantageous for use in medical devices such as nebulizers (e.g. neonatal nebulizers). Alternatively, other substrates such as titanium may be used for the plate.

FIG. 1A shows a schematic of the membrane design for manufacturing porous mesh plates. In one embodiment, the plate 100 has an outer edge 101 and an outer diameter 109 of 25 mm, and a channel 102 that has a length 108 of 22 mm. The channel width 103 is 1.5 mm, and in the center is a recess 104 with a diameter 105 of 8 mm. The thickness of the plate 106 is 100 μm, and the channel has a depth 107 of 20 μm, while the residual recess 104 has a depth of 80 μm. The residual recess thickness 115 is 20 μm. FIG. 1B shows mesh plates 110 after being subjected to ECM machining. The plates 1, 2, 3, and 4 include channels 112 for attaching fluid flow as well as residual recesses 114. FIG. 1C shows schematic 130 of one embodiment of the process for making dimples in the substrate (e.g. a plate) using a laser drilling process. A laser beam 137 is generated by the laser source 135 and is directed via a first mirror 140 and a second mirror 141 to a scanning head 145 comprising a focusing lens 150. The scanning head and focusing lens focus the laser to the substrate 155, which is held on a substrate holder 160. The action (e.g. power and orientation) of the laser beam can be adjusted to generate dimples of the desired size, shape and pattern in the substrate. In some embodiments, the thickness of the substrate (e.g. plate or fluid handling disc) can be greater than 100 µm. For instance, in some embodiments, the substrate (e.g. plate) can be about 150 µm thick. In some embodiments, the substrate (e.g. plate) can be about 200 µm thick. In some embodiments, the substrate (e.g. plate or fluid handling disc) can be about 250 µm thick. In some embodiments, the substrate (e.g. plate or fluid handling disc) can be greater than about 250 µm thick.

Figure 1B:
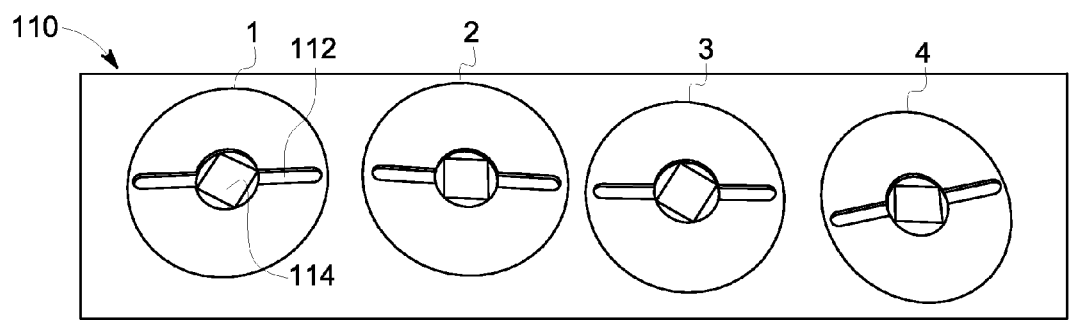
Figure 1C:
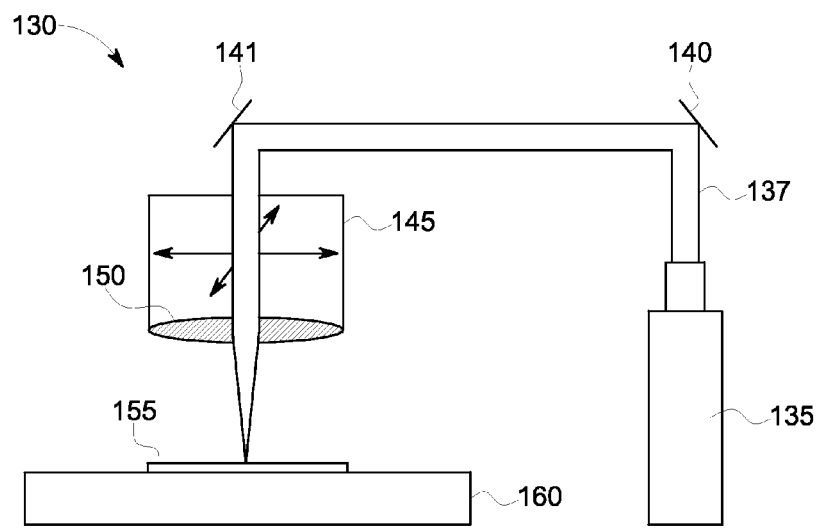

The channels seen in FIGS. 1A-1B are used for delivering the liquid to be atomized to the recesses and carrying excess fluid from the recess out of the disc. The recess is used for holding the liquid conveyed through the channel(s) while being atomized. In some embodiments, the channels and recess may be patterned into a substrate (e.g. a stainless steel plate) after the drilling and electrochemical etching and/or electrochemical machining protocol. Alternatively, in some embodiments, the channels and recess may be patterned into a substrate (e.g. a stainless steel plate) before the drilling and electrochemical etching and/or electrochemical machining process. In both cases, a final etching or machining process is used to create holes (e.g. pores) of the desired size in the substrate.

In some embodiments, the current technology generally employs a two-step procedure. First, dimples are drilled in a top surface of a substrate (e.g. a plate) but do not penetrate the bottom surface of the substrate. Second, an electrochemical process is used to remove a layer of material from the bottom surface of the substrate. Enough material is removed from the bottom surface of the substrate such that the dimples are able to penetrate the bottom surface of the substrate (e.g. a plate).

The dimples that are formed in one or more surfaces (e.g. substrates) to create the mesh can be made by various methods. In some embodiments of the process, a method such as laser drilling or ion/electron-beam drilling is used to make dimples in the a surface (e.g. the top surface) of the substrate (e.g. a stainless steel plate). In some embodiments, the dimples are conical, not cylindrical in shape; that is, the diameter of the dimples is greatest at the top of the dimple near the top surface of the substrate (e.g. plate or fluid handling disc) where the drilling is carried out, and the dimples converge to a point at their greatest depth (e.g. between the bottom surface and the top surface of the substrate or plate). In some embodiments the dimples penetrate the substrate (e.g. plate) to a depth of about 10 µm to about 20 µm from the bottom surface. For instance, in some embodiments the substrate (e.g. the plate) can have a thickness of between about 50 µm to about 500 µm, and the dimples can penetrate to a depth of about 40 µm to about 490 µm. In some embodiments, the dimples can penetrate to a depth of about 10 µm, a depth of about 20 µm, a depth of about 50 µm, a depth of about 75 µm, a depth of about 100 µm, a depth of about 125 µm, a depth of about 150 µm, a depth of about 175 µm, a depth of about 200 µm, a depth of about 250 µm, a depth of about 300 µm, a depth of about 350 µm, a depth of about 400 µm, a depth of about 450 µm, a depth of about 475 µm, a depth of about 490 µm, or a depth of about 500 µm.

In some embodiments, it is advantageous to begin the process of manufacturing a porous mesh plate with a thick stainless steel substrate or plate (e.g. about 250 µm thick). The thickness of the substrate or plate means that the substrate (e.g. a plate) will be more robust and correspondingly less prone to physical deformations such as bending than thinner substrates (e.g. about 50 µm thick). Accordingly, in some embodiments, when the dimples are drilled, they may be more uniform in size and shape than they would be if a thinner substrate or plate were used that is prone to bending or other physical distortions.

Additionally, because the dimples do not penetrate through the substrate (e.g. a stainless steel plate) when drilled from the top surface of the substrate or plate, there is no damage to the bottom surface of the substrate or plate from the drilling protocol. Accordingly, this technique avoids damage to the bottom surface of the substrate may arise when a drilling technique is employed that penetrates the entire substrate. For instance, a drilling operation that penetrates the entire substrate may give rise to a ring of molten substrate on the bottom surface of the substrate when it penetrates the bottom surface. The ring of molten substrate may harden as it cools, leading to an uneven surface on the bottom of the substrate. Because this technology does not use a drilling protocol that penetrates through the entire substrate (e.g. plate), there is no danger of generating an uneven surface on the bottom of the substrate.

After drilling the dimples in the top surface of the substrate, the technology provides for using electrochemical etching, electrochemical machining, or both to remove a layer of material from the bottom surface of the substrate. Electrochemical etching (ECE) uses a solution comprising dissolved ions or chemical species in the presence of an applied electric current to remove layers of material from the bottom and/or top surface of the substrate. Electrochemical machining uses a tool (e.g. a piston electrode) in close proximity to the substrate (e.g. the plate) and an electric current to remove a layer of material from the top and/or bottom surface of the substrate. In some embodiments, the tool (e.g. the piston electrode) can be formed in a desired shape in order to machine a corresponding shape into the substrate. For instance, if the tool (e.g. a piston electrode) is formed into the shape of a triangle, the area of the substrate (e.g. the plate) that is etched will similarly be in the shape of a triangle.

Figure 2A:
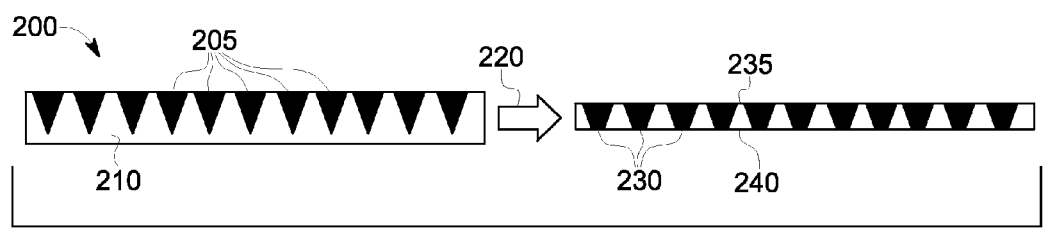

FIG. 2A is a side-view schematic representation of the electrochemical machining process for mesh hole size control. As shown in FIG. 2A, a substrate 200 (e.g. a plate) is provided in which dimples are drilled. The dimples 205 are conical in shape, and do not initially penetrate the bottom of the substrate (e.g. a stainless steel plate) 210. The arrow 220 represents an electrochemical machining or etching process wherein one or more layers of material are removed electrochemically from the bottom surface of the substrate. In some preferred embodiments, enough material is removed from the bottom surface of the substrate to enable the dimples to reach through the bottom surface of the plate, thereby creating a plurality of holes 230 in the substrate. In some embodiments, material is removed both from the top surface 235 of the substrate through etching and from the bottom surface 240 of the substrate through etching. This process allows for control of desired hole geometry and size characteristics. In some embodiments, the material is removed from the bottom surface 240 of the substrate (e.g. the surface opposite the surface in which the dimples were drilled) by electrochemical machining.

Figure 2B:
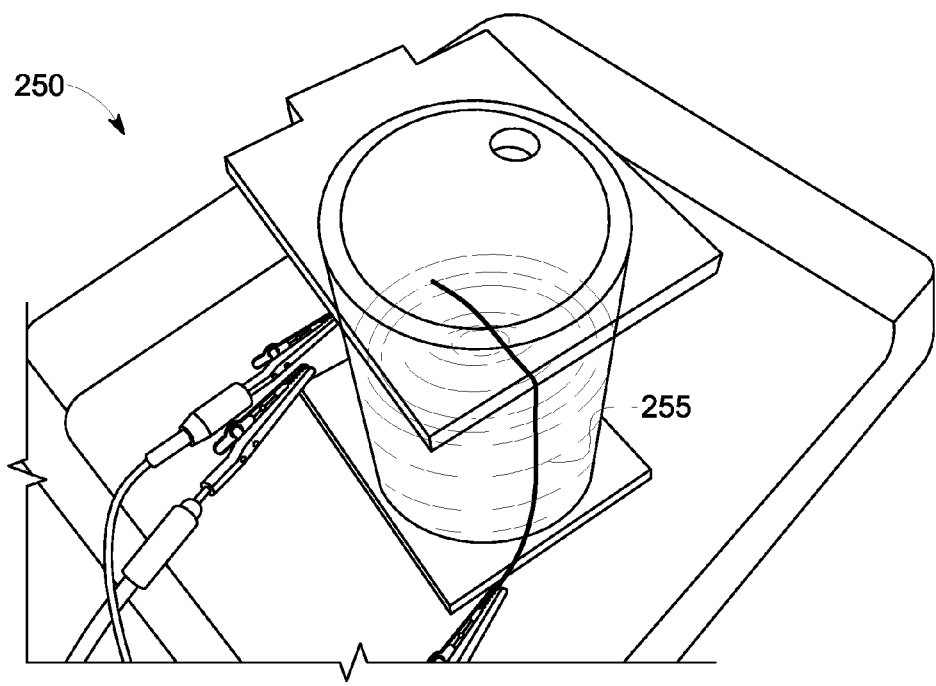
Figure 2C:
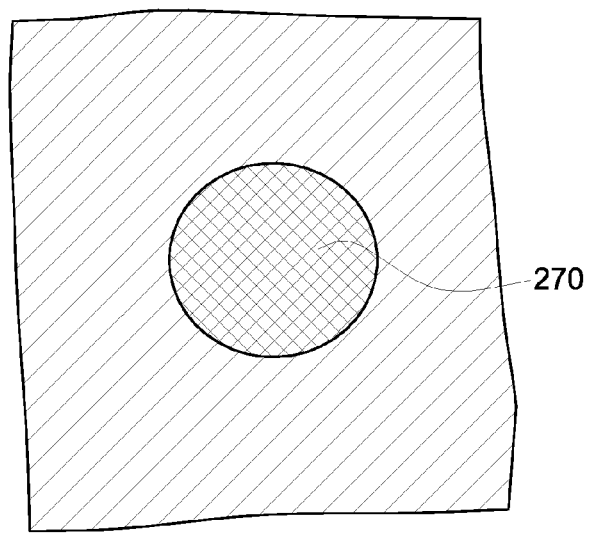

FIG. 2B shows a test cell 250 for electrochemical etching of a thin plate with dimples. The electrolytic solution 255 in use in this embodiment comprises 55 wt % phosphoric acid, 14 wt % sulfuric acid and 31 wt % water. The etching process provides a desired rate of removal of material from the surface of the substrate to a achieve a desired final thickness by varying the parameters of current and time in a given electrochemical solution. For instance, using an electrolytic solution comprising 55 wt % phosphoric acid, 14 wt % sulfuric acid and 31 wt % water at a current of 10 mA for 240 seconds, one can etch away a thickness of 0.3 microns from the surface of a stainless steel substrate (e.g. a plate), based on weight loss. Alternatively, using a current of 20 mA for 300 seconds, one can etch away a thickness of 1.7 microns from the surface of a stainless steel substrate, based on weight loss. Additionally, using a current of 20 mA and a time of 600 seconds, one can etch away a thickness of 2.1 microns from the surface of a stainless steel substrate, based on weight loss. In some embodiments, it is possible to use Faraday's Law to calculate the amount of time and current necessary to remove a desired amount of material from the surface of the substrate by measuring the area of the substrate to be etched and calculating a desired volume to be etched based on the depth of the dimples and the thickness of the substrate. FIG. 2C shows an etched zone 270 of a stainless steel substrate, wherein about 3 microns of material have been removed in a timespan of about five minutes.

In some embodiments, after electrochemical etching the weight loss is found to correspond to removal of less material than expected based on calculations with Faraday's Law. The reason for the reduced mass loss is that a certain fraction of the current passed through the electrochemical cell is utilized for oxygen evolution due to water oxidation at voltages greater than 1.0 V vs. platinum at 25° C. In some embodiments about 58% of the current is utilized for oxygen evolution. Accordingly, although applying a current of 20 mA for 300 seconds theoretically gives an etched thickness of 4.0 μm, in practice only 1.7 μm of material are removed based on weight loss. Similar examples for other trials are summarized in Table 1 below:

TABLE 1

Examples of differences between expected thickness etched and actual thickness etched.

| Current (mA) | Time (sec) | Thickness Etched (microns) - wt. loss | Expected Thickness etched (Theoretical) - Microns |
|---|---|---|---|
| 10 | 240 | 0.3 | 1.6 |
| 20 | 300 | 1.7 | 4.0 |
| 20 | 600 | 2.1 | 8.0 |

Figure 3:
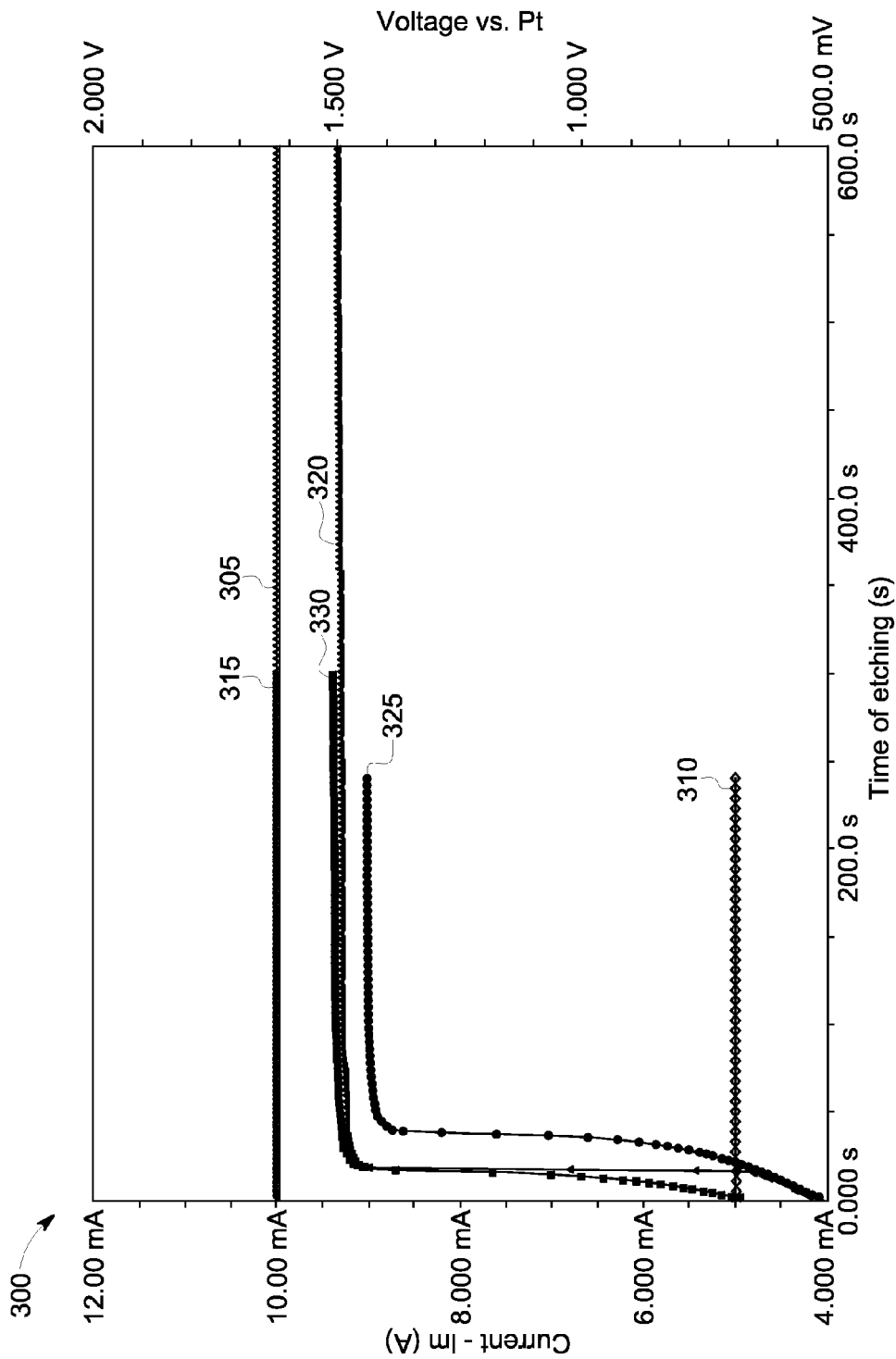
Figure 4A:
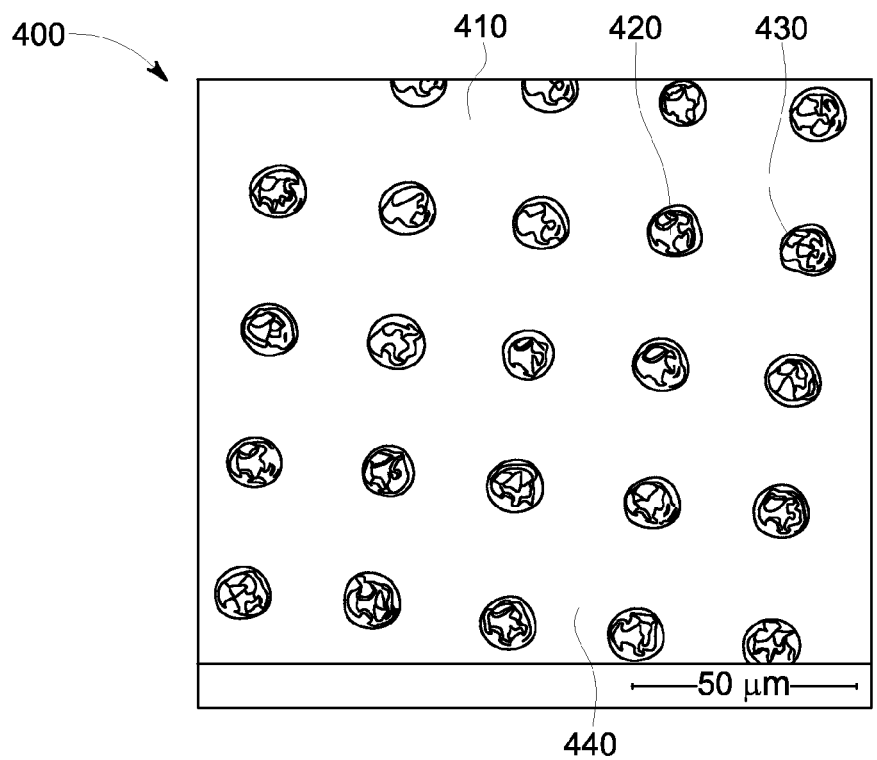
Figure 4B:
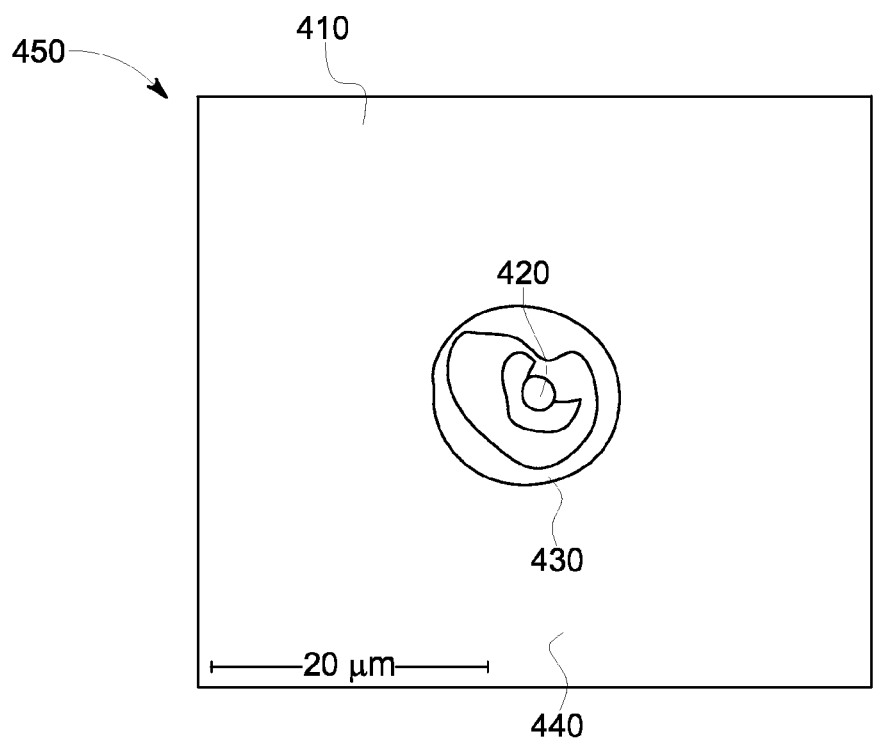
Figure 5A:
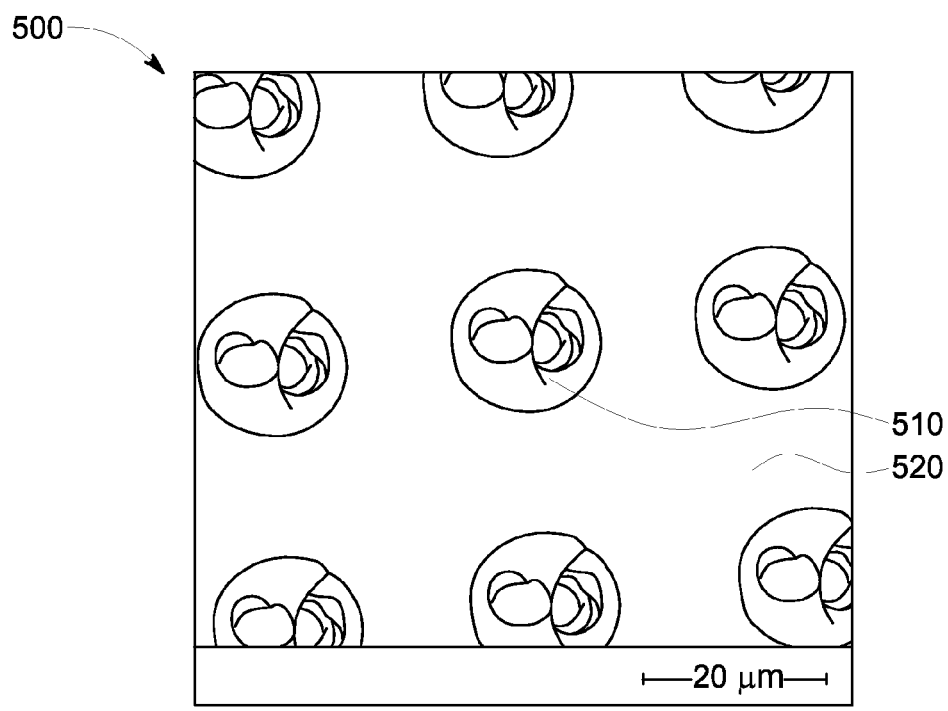
Figure 5B:
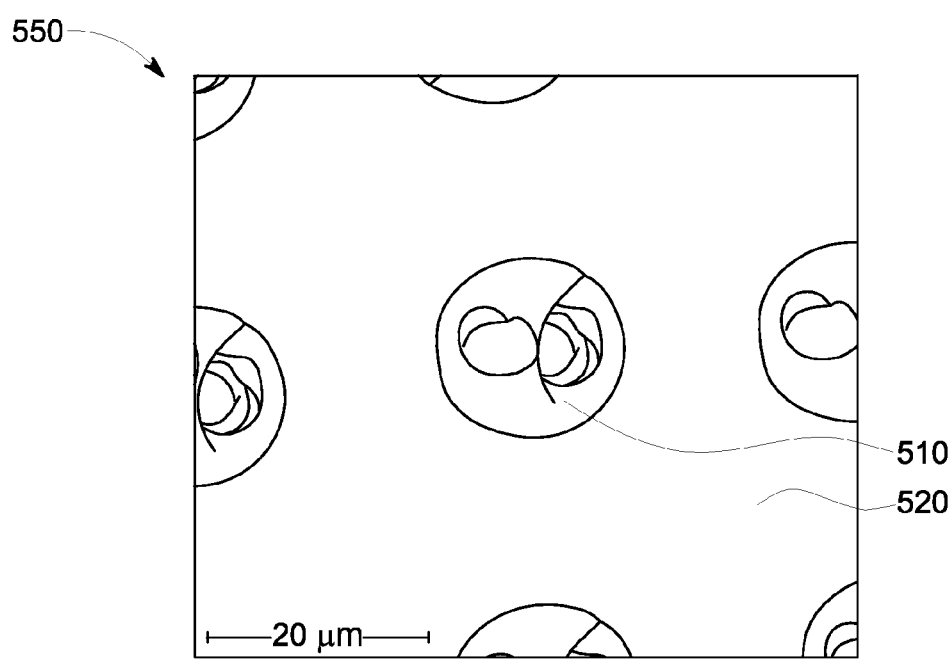

FIG. 3 shows a graph of constant current etching parameters for current and voltage. Part 300 shows a graph of constant current etching of Stainless Steel 304 foils in 55% phosphoric acid, 14% sulfuric acid, and 31% water solution at 25° C. In this embodiment, the stainless steel foil is the substrate. Line 305 shows 20 mA/cm$^2$ current for 10 minutes. Line 310 shows 10 mA/cm$^2$ current for 4 minutes. Line 315 shows 20 mA/cm$^2$ current for 5 minutes. Line 320 shows voltage for current of 20 mA/cm$^2$ for 10 minutes. Line 325 shows voltage for current of 10 mA/cm$^2$ for 4 minutes. Line 330 shows voltage for current of 20 mA/cm$^2$ for 5 minutes. Use of constant current etching helps in optimizing etching time to remove a given amount of material (e.g. 3 microns) from the surface of a substrate. Because the use of constant current etching allows for a precise amount of material to be removed by the etching process, it is possible to control the size of the holes that are produced when the dimples penetrate the bottom of the substrate. Because the dimples are conical in shape, the more material is removed from the surface of the substrate by etching, the larger the size of the holes. For instance, in some embodiments the holes produced by this process may be less than about 10 μm in diameter, or may be less than about 5 μm in diameter. In some embodiments, the holes may be less than about 4 μm in diameter, the holes may be less than about 3 μm in diameter, or the holes may be less than about 2.5 μm in diameter. In some embodiments, the holes may be less than about 2 μm in diameter. In some embodiments, the size of the holes have a diameter roughly one half the diameter of the aerosol particles (e.g. droplets) that are desired.

A number of electrolytic solutions are possible for the electrochemical etching and machining processes. For instance, in some embodiments, the etching mixture comprises sodium chloride (NaCl), sodium nitrate ($NaNO_3$), and/or nitric acid ($HNO_3$). In some embodiments, only benign acids are used for the electrochemical etching and machining processes. In some embodiments, only natural mineral acids are used for the electrochemical etching and machining processes (e.g. phosphoric acid and sulfuric acid).

FIGS. 4 and 5 illustrate the effect of electrochemical etching or machining on a thin plate after drilling dimples in the thin plate. FIG. 4A shows an image 400 at the 50 μm scale of a nebulizer substrate before electrochemical etching, and FIG. 4B shows an image 450 at the 20 μm scale of a nebulizer substrate before electrochemical etching. Elemental analysis of the substrate 410 around the dimples 420 shows that the debris content 430 (e.g. the material within the immediate vicinity of the dimples, after drilling) has more oxide content than the bulk material 440 (e.g. the material found away from the dimples). The debris content exists a result of the drilling process, because the techniques used to make the dimples (e.g. laser drilling, ion or electron beam drilling) disrupts chemical bonds and facilitates oxidation of the material in the immediate area of the dimples. The elemental analyses for the debris content (e.g. the material in the immediate vicinity of the dimples) and the bulk material (e.g. the material away from the dimples) is shown in Table 2 below:

TABLE 2

Elemental Analyses of Substrate Before Etching

| Debris Content | | | Bulk Material | | |
|---|---|---|---|---|---|
| Element | Weight % | Atomic % | Element | Weight % | Atomic % |
| C | 1.84 | 7.21 | C | 4.61 | 17.22 |
| O | 4.5 | 13.24 | O | 2.90 | 8.12 |
| Si | 0.44 | 0.74 | Si | 0.39 | 0.63 |
| — | — | — | V | 0.20 | 0.18 |
| Cr | 17.28 | 15.65 | Cr | 17.12 | 14.75 |
| Mn | 1.61 | 1.38 | Mn | 1.50 | 1.22 |
| Fe | 64.05 | 54.01 | Fe | 62.68 | 50.30 |
| Ni | 8.69 | 6.97 | Ni | 8.90 | 6.80 |
| Mo | 1.58 | 0.78 | Mo | 1.70 | 0.79 |
| Total | 100 | 100.07 | Total | 100 | 100.01 |

After electrochemical etching or machining, the debris content is removed from the vicinity of the holes by the electrochemical process. FIG. 5A shows an image 500 at the 20 μm scale of a nebulizer substrate after being subjected to the electrochemical etching process, and FIG. 5B shows a close-up image 550 of a nebulizer substrate after being subjected to the electrochemical etching process. Elemental analysis of the material in the vicinity of the holes 510 and away from the holes 520 (e.g. in the bulk material) is shown below in Table 3. As is seen, the relative amount of oxides in the vicinity of the holes has been reduced by the electrochemical etching process, and there is no debris around the holes. This is advantageous because it is desirable that the holes have the same chemical makeup as the bulk material; it is not desirable for the holes to have reactive oxide material or debris in their vicinity.

TABLE 3

Elemental Analyses of Substrate After Etching

| Debris Content (Near Holes) | | | Bulk Material (Away from Holes) | | |
|---|---|---|---|---|---|
| Element | Weight % | Atomic % | Element | Weight % | Atomic % |
| O | 0 | 0 | O | 1.6 | 5.29 |
| — | — | — | Si | 1.18 | 1.94 |
| Cr | 22.33 | 23.65 | Cr | 19.1 | 19.39 |
| Mn | 2.57 | 2.58 | Mn | 1.06 | 1.02 |
| Fe | 69.56 | 68.58 | Fe | 67.05 | 63.37 |
| Ni | 5.53 | 5.19 | Ni | 10.01 | 9 |
| Total | 100 | | Total | 100 | |

In some embodiments, electrochemical machining is used in addition to electrochemical etching. In some embodiments, electrochemical machining allows the use of a piston in the immediate vicinity of the substrate to carry out electrolysis, and remove a layer of material from one surface of the substrate. In some embodiments electrochemical etching is carried out only from the back surface, and the amount of the material removed from the back surface is dependent upon the action of a motor in electrical communication with the piston. In some embodiments, the piston is formed in a particular shape that is advantageous for use in the electrochemical machining (ECM) process (e.g. the shape of the piston corresponds well to the desired shape of the porous mesh plate). For instance, the piston may have the shape of a circle, and when used in the electrochemical machining (ECM) process, the shape of the area of the substrate that is etched would be a circle.

Figure 6A:
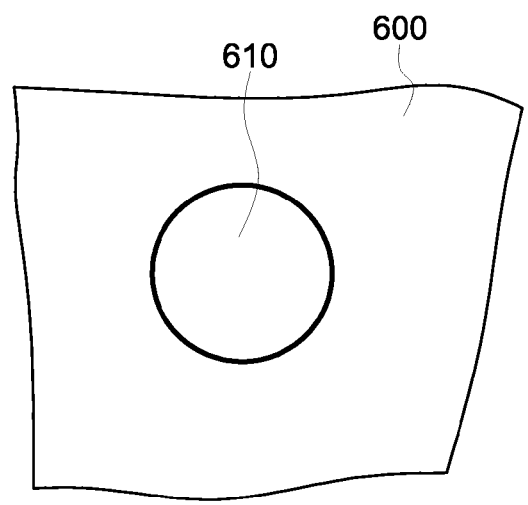
Figure 6B:
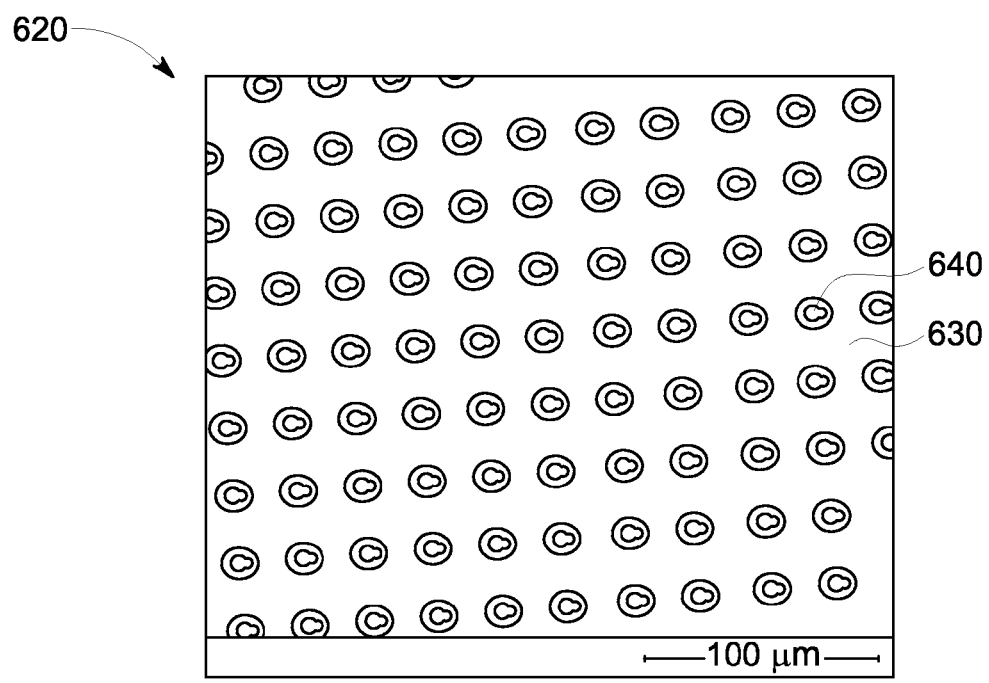
Figure 6C:
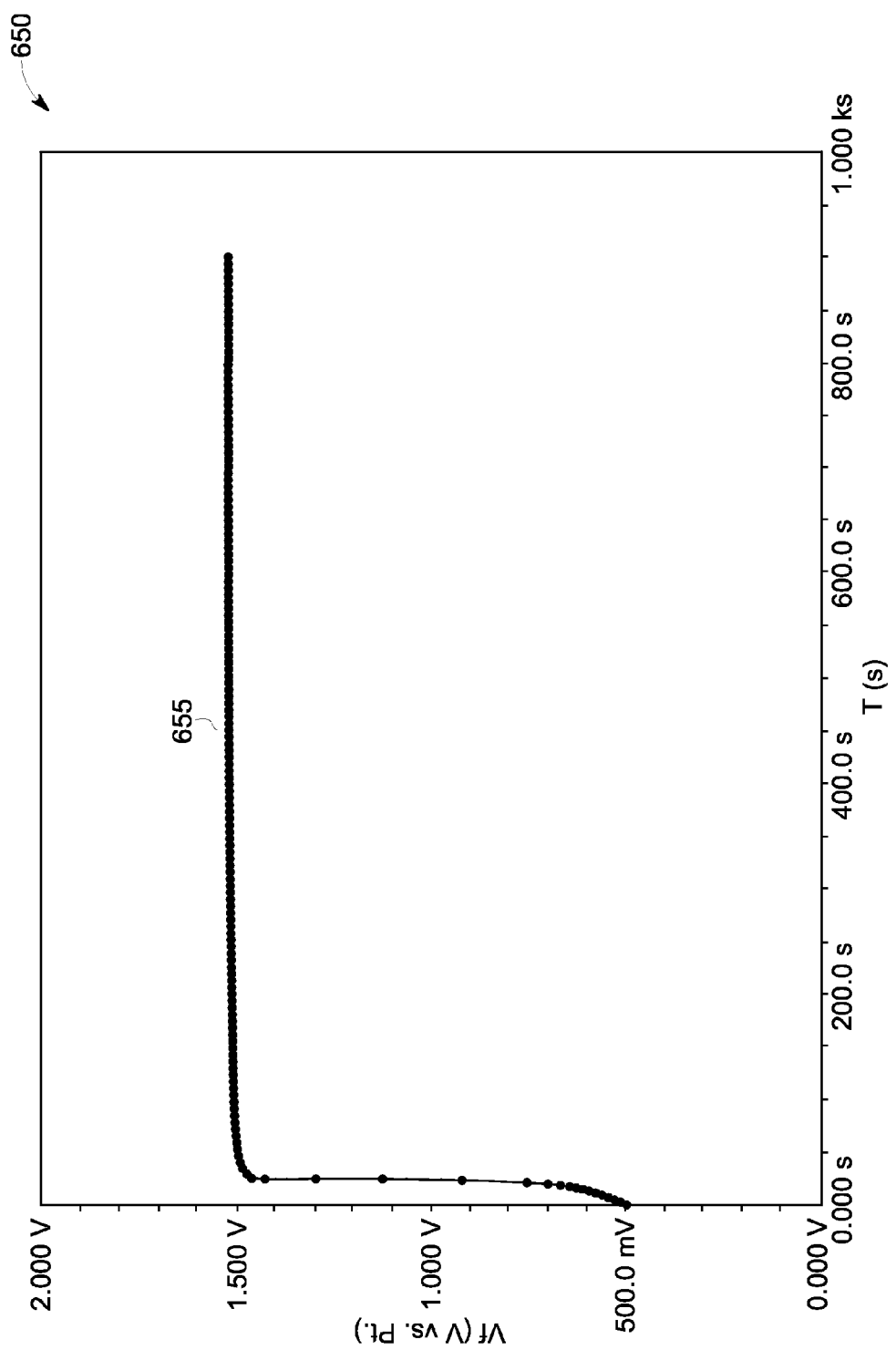
Figure 7A:
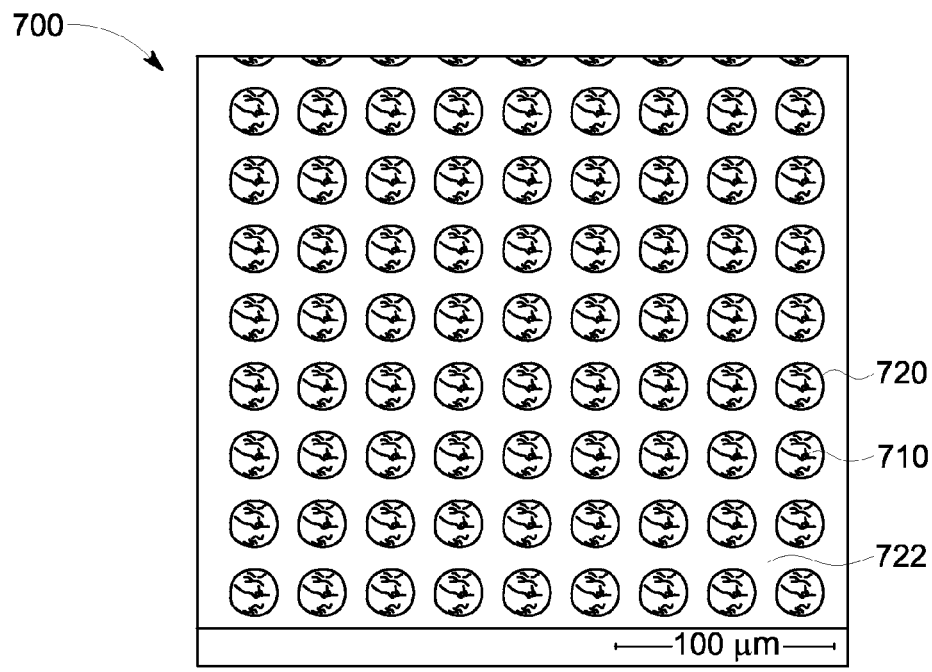
Figure 7B:
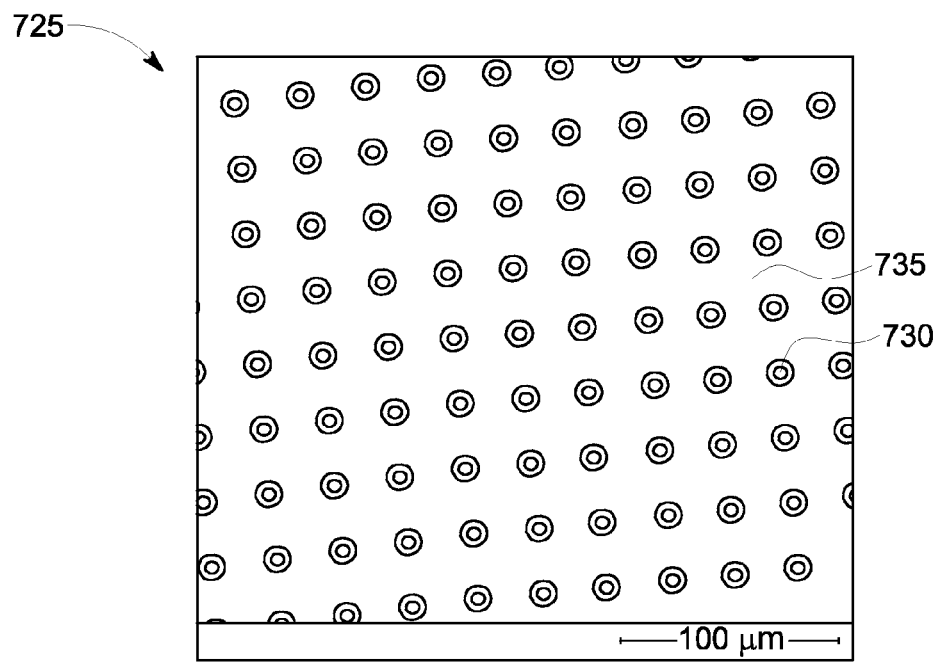
Figure 7C:
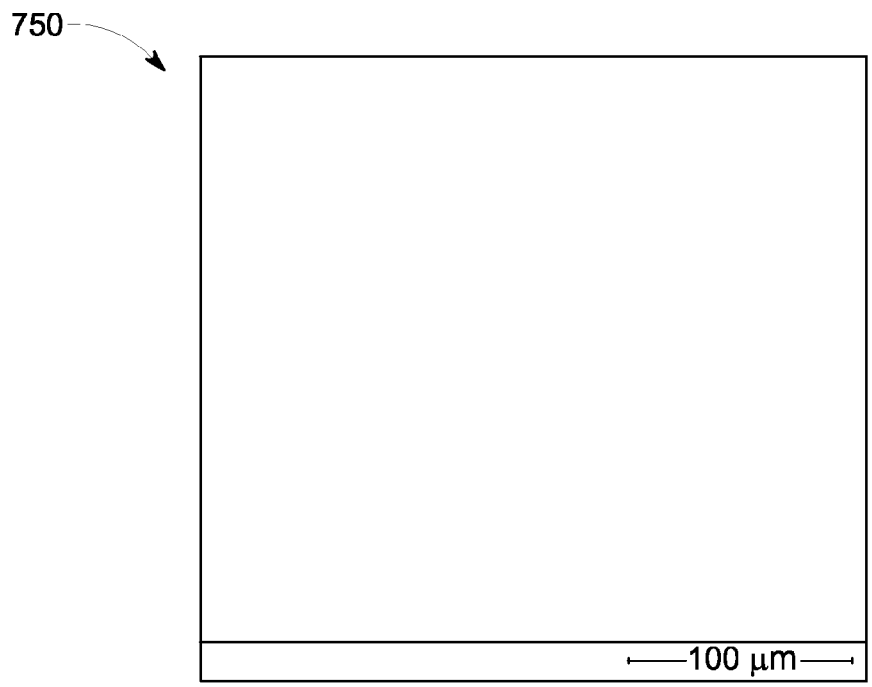
Figure 7D:
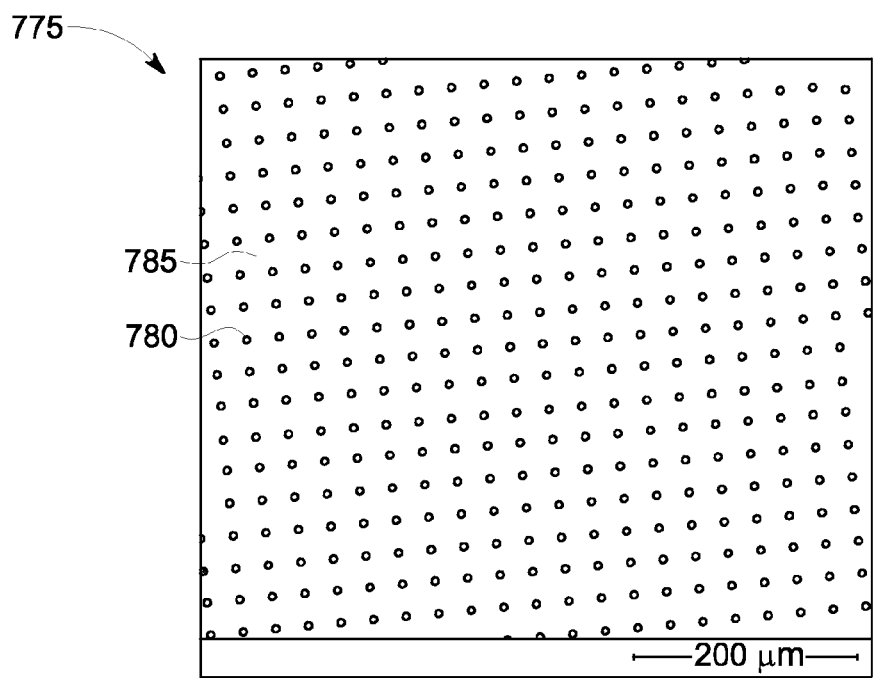

FIG. 6A shows an etched region of nebulizer substrate after 20 minutes of electrochemical etching. The substrate 600 contains a circular etched region 610. FIG. 6B shows an image 620 magnified at the 100 μm scale of a nebulizer substrate after 20 minutes of electrochemical etching. The bulk material is shown as 630 and the holes are shown as 640. FIG 6C shows a graph 650 of a galvanostatic scan of a nebulizer stainless steel substrate in 55 weight % phosphoric acid plus 14% sulfuric acid plus 31% water at 20 mA/cm$^2$ current density at 25° C. Line 655 shows the Vf (V vs. Pt) scan of a stainless steel nebulizer foil for 15 minutes.

FIG. 7 shows a before and after comparison of one embodiment of a substrate before and after etching and after drilling of dimples. FIG. 7A shows an image of the top of a substrate 700 before etching. The substrate has dimples 710 and debris 720 dispersed in and on the bulk material 722. FIG. 7B shows an image of the top of a substrate 725 after etching. The substrate has holes 730 within the bulk material 735 and has less debris than before etching.

FIG. 7C shows an image of the bottom of a substrate 750 before etching. The substrate does not contain any holes because the dimples 710 drilled in the top of the substrate 700 did not penetrate the bottom surface 750. FIG. 7D shows an image of the bottom of a substrate 775 after etching. Enough of the layers of material have been removed from the bottom of the substrate by the etching process to allow the dimples 710 to penetrate the bottom 775, generating holes 780 in the bulk material 785. The size of the holes can be controlled by the extent to which the electrochemical process (e.g. electrochemical machining or electrochemical etching) is allowed to proceed.

The current technology provides methods for efficiently manufacturing porous mesh plates for use in ultrasonic mesh nebulizers, and provides the mesh plates produced by the same methods. The methods generally employ a two-step process. In the first step, dimples are drilled into the top surface of a substrate (e.g. a stainless steel plate). The dimples do not penetrate the bottom surface of the substrate. In the second step, a layer of material is removed electrochemically from the bottom surface of the substrate. In some embodiments enough material is removed that the dimples penetrate the bottom surface of the substrate to make holes. By using this two-step process, it is possible to manufacture porous mesh plates for use in ultrasonic mesh nebulizers. The porous mesh plates made by this process can have holes that are uniform in size (e.g. less than 2 μm in diameter). Accordingly, the porous mesh plates can be used in ultrasonic mesh nebulizers to generate aerosolized droplets that are of uniform size (e.g. less than 4 μm in diameter).

Ultrasonic mesh nebulizers capable of generating aerosolized droplets of uniform size can be used in a number of applications. For instance, ultrasonic mesh nebulizers can be used in inhaled aerosol therapy to treat respiratory ailments such as COPD, cystic fibrosis and asthma. Additionally, the current technology can be used to generate porous mesh plates for other applications besides ultrasonic mesh nebulizers. For instance, the current technology can be used to manufacture filters and the like.

The following illustrative examples are provided to demonstrate some of the methods and techniques used to create dimples and/or porous meshes in accordance with the present invention. The following examples as well as the above description are intended to illustrate and not limit the scope of the invention. Other aspects, advantages and modifications within the scope of the invention will be apparent to a practitioner skilled in the art.

EXAMPLES

Example 1

Drilling of Dimples in a Substrate (e.g. a Plate or Fluid Handling Disc)

A 100 μm thick stainless steel substrate is provided. An electron-beam drill is used to drill dimples to a depth of 98 μm across a total area of 0.5 cm$^2$. The dimples are arranged in a square grid pattern, and separated on all four sides by other dimples at a distance of 30 μm (distance from one center to another center). The diameter of the dimples at the top surface of the substrate is 20 μm, and the dimples converge to a point at the depth of 98 μm in the substrate.

Example 2

Electrochemical Etching of the Substrate to Create a Porous Mesh

Faraday's law is given as follows:

$$m = \left(\frac{Q}{F}\right)\left(\frac{M}{z}\right),$$

wherein:

m is the mass of the substance liberated at an electrode in grams, or m=Volume×Density=Area×Thickness etched× Density. The density of stainless steel is 7.9 g/cm$^3$.

Q is the total electric charge passed through the substance, and can be expressed as Q=i$^\times$t F=96,485 C (mol$^{-1}$) is the Faraday constant.

M is the molar mass of the substance.

z is the valency number of ions of the substance (electrons transferred per ion). For the case of stainless steel, M/z=25.24 g/mol.

Thus, to remove a layer of 4 μm over an area of 0.5 cm$^2$, using a current of 10 mA, the time, D, in seconds necessary to etch is calculated as follows:

(0.5 cm$^2$)(4×10$^{-4}$ cm)(7.9 g/cm$^3$)=1.58×10$^{-3}$ g stainless steel substrate to be removed, therefore:

$$1.58 \times 10^{-3} g = \left(\frac{10 mA \times Ds}{96,485 C/mol}\right)(25.24 \text{ g/mol})$$

$$600s = D(s)$$

Accordingly, to remove a layer of 4 μm from a stainless steel substrate with a square-grid pattern of holes patterned across an area of 0.5 cm$^2$, the substrate is transferred to an electrochemical cell comprising a solution of 55% H$_3$PO$_4$, 14% H$_2$SO$_4$, and the remainder water. The substrate serves as an anode (e.g. positive electrode) in an electrochemical reaction while a non-corroding material such as platinum or graphite serves as an anode (e.g. negative electrode). A voltage of about 1.5 V is applied across the anode and cathode to provide a current of about 10 mA, and a layer of material is removed from the stainless steel substrate as the surface metal is converted into dissolved ions as the current passes between the anode and cathode. The electrochemical reaction is allowed to proceed for about 600 seconds.

As a quality control measure, the actual mass removed is calculated based on weight loss. If enough material has not been removed from the bottom surface of the substrate after the calculated time to produce holes in the bottom surface of the substrate due to current being diverted into oxidation of water, the substrate is re-subject to the conditions of electrochemical etching until the desired mass of material is removed.

Example 3

Electrochemical Machining of the Substrate to Create a Porous Mesh

Figure 8A:
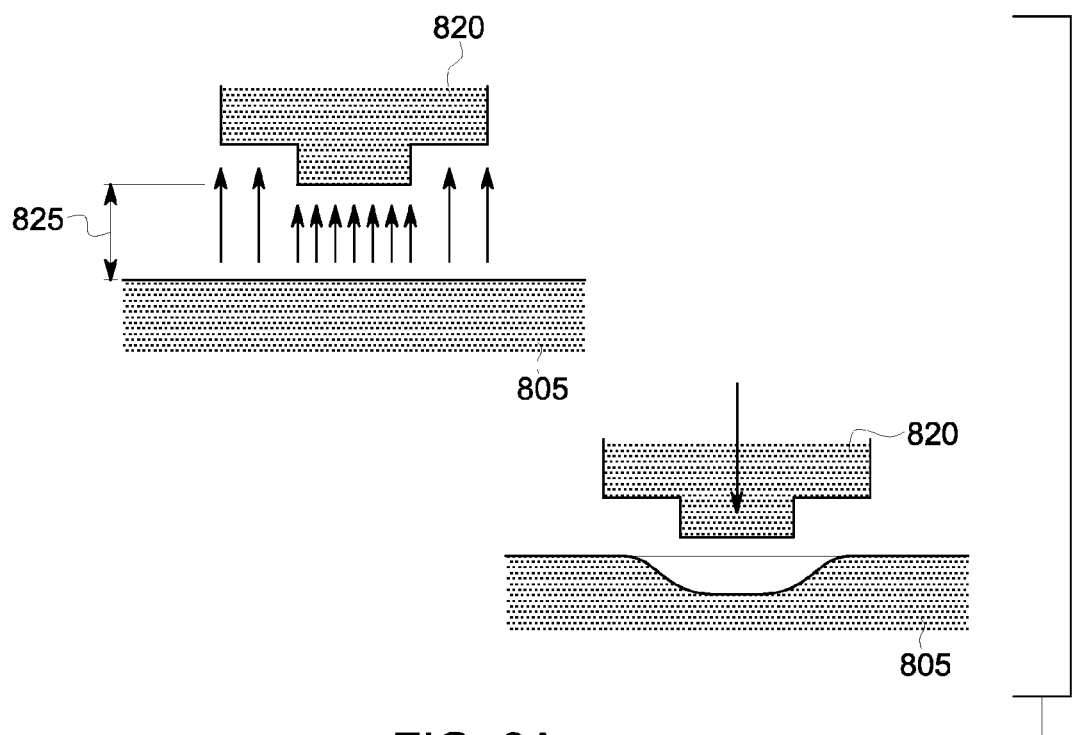
Figure 8B:
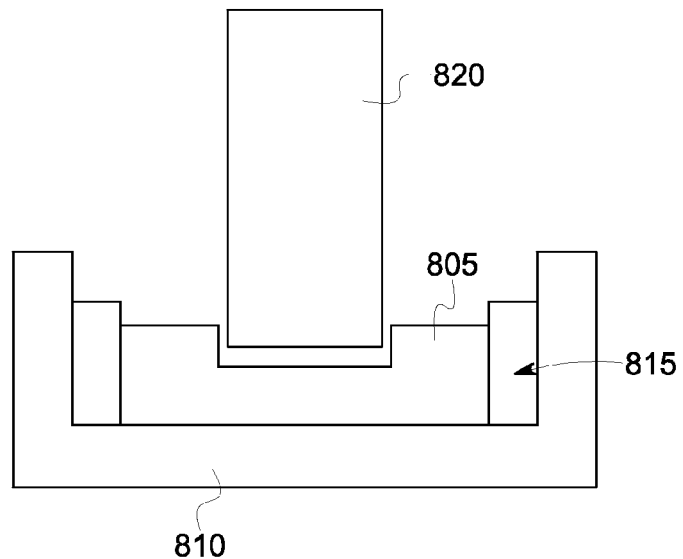

As shown in FIGS. 8A and 8B, a stainless steel substrate 805 with a square-grid pattern of holes is placed in an electrolysis cell 810 comprising an electrolyte solution 815 of NaCl in water. The electrolyte concentration is 33 g/L, and the pH is 7.0. A tool (e.g. a piston electrode) 820 comprising brass serves as the cathode (e.g. negative electrode) of the electrolysis cell, while the stainless steel substrate 805 serves as the anode of the electrolysis cell. The tool 820 is fashioned into the shape of a square, and brought to a distance 825 of 0.6 mm from the substrate, in accordance with the teachings of Rajurkar et al. such that the closer sections of the anode and cathode have a higher current density. ("New Developments in Electro-chemical Machining." *Annals of the CIRP* (v48, n2), pp 567-579, 1999.) The rate of material removal is 30 mm$^3$/min. As material is removed from the surface of the substrate 805 (e.g. the anode), the cathode 820 is moved down to remain in close proximity to the surface of the substrate. The pattern etched into the substrate 805 is a square, because the shape of the tool 820 (e.g. the piston electrode) is in the shape of a square. For better accuracy, lower concentration electrolyte is chosen and the tool is brought closer to the machined, and a longer machining time is used.

Example 4

Electrochemical Machining and Electrochemical Etching to Create a Porous Mesh

In some embodiments, both electrochemical machining and electrochemical etching can be used. One advantage of electrochemical etching is that it removes debris from the surface of the substrate (e.g. a stainless steel plate) while one advantage of electrochemical machining is that it allows the removal of material across a patterned area through use of a patterned or specifically shaped tool (e.g. a piston electrode).

A stainless steel substrate with a square-grid pattern of holes is transferred to an electrochemical cell comprising a solution of 55% H$_3$PO$_4$, 14% H$_2$SO$_4$, and the remainder water. The substrate serves as an anode (e.g. positive electrode) in an electrochemical reaction while a non-corroding material such as platinum or graphite serves as an anode (e.g. negative electrode). A voltage of 1.5V is applied across the anode and cathode, and a layer of material is removed from the stainless steel substrate as the surface metal is converted into dissolved ions as a current of about 10 mA passes between the anode and cathode.

The stainless steel substrate 805 with a square-grid pattern of holes is then placed in an electrolysis cell 810 comprising an electrolyte solution 815 of NaCl in water as shown in FIGS. 8A and 8B. The electrolyte concentration is 33 g/L, and the pH is 7.0. A tool (e.g. a piston electrode) 820 comprising brass serves as the cathode (e.g. negative electrode) of the electrolysis cell, while the stainless steel substrate 805 serves as the anode of the electrolysis cell. The tool 820 is fashioned into the shape of a square, and brought to a distance 825 of 0.6 mm from the substrate, in accordance with the teachings of Rajurkar et al. such that the closer sections of the anode and cathode have a higher current density. ("New Developments in Electro-chemical Machining." *Annals of the CIRP* (v48, n2), pp 567-579, 1999.) The rate of material removal is 30 mm$^3$/min. As material is removed from the surface of the substrate 805 (e.g. the anode), the cathode 820 is moved down to remain in close proximity to the surface of the substrate. The pattern etched into the substrate 805 is a square, because the shape of the tool 820 (e.g. the piston electrode) is in the shape of a square. For better accuracy, lower concentration electrolyte is chosen and the tool is brought closer to the machined, and a longer machining time is used.

Example 5

Representative Configurations for Mesh Plate

Figure 9:
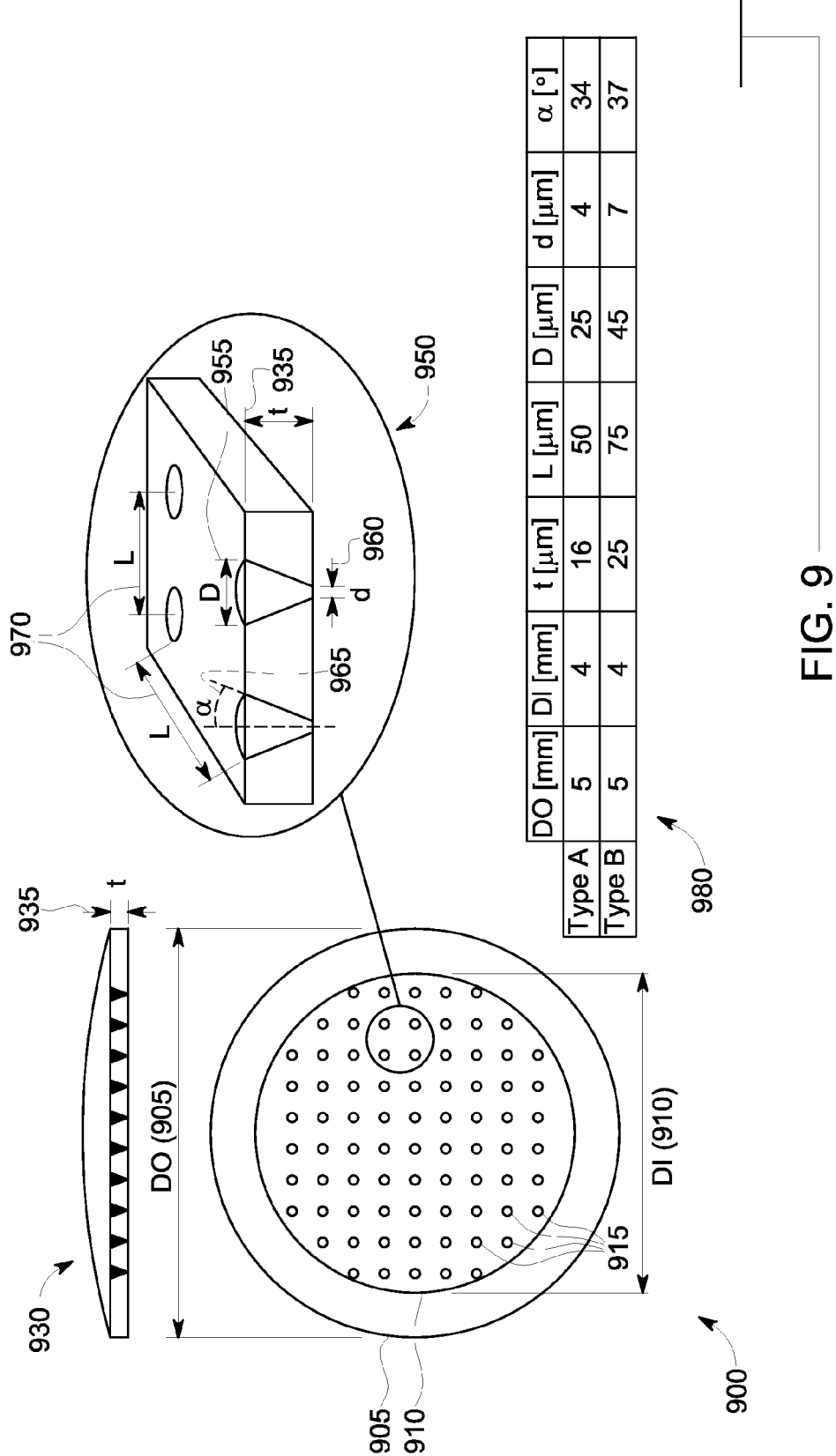

FIG. 9 shows two representative embodiments of possible configurations of holes on the mesh plate. The diagram 900 shows a porous mesh plate having an outer diameter (DO) 905 and an inner diameter (DI) 910 as well as a plurality of holes arranged in a pattern 915. The side-on view 930 shows the thickness of the plate 935. The magnified schematic 950 shows representative dimensions of the dimples after an etching protocol, as well as their arrangement on the mesh plate. For instance, the magnified image 950 shows the diameter of the dimples on the top surface (D) 955, the diameter of the holes on the bottom surface (d) 960, the angle of the dimples (a) 965, and the distance between the centers of two dimples on the plate 970. Representative values for these items in certain embodiments are given in the table 980.

In order to make a porous mesh plate for use in a nebulizer, in some embodiments a channel and a residual recess can be patterned into a mesh plate after the drilling and electrochemical etching or electrochemical machining processes used to generate a mesh plate such as the ones embodied in FIG. 9. Alternatively, in some embodiments, the drilling and electrochemical etching or electrochemical machining processes can take place after a channel or channels and a residual recess have already been patterned into a substrate (e.g. a stainless steel plate).

What is claimed is:

1. A method for making fluid handling discs as used for drug delivery using mesh nebulizers, comprising:
   providing a fluid handling disc having a top surface and a bottom surface;
   drilling dimples in the top surface of the disc, wherein the dimples do not penetrate the bottom surface of the disc, and wherein each dimple has a diameter greatest at the top surface and converges to a smaller diameter at the lowest point of the dimple;
   patterning channels into the disc the channels attaching fluid flow to deliver liquid to be atomized to the dimples and to carry excess fluid from the dimples out of the disc;
   etching the disc via electrochemical etching to remove a layer of material from the bottom surface of the disc, wherein removal of a layer of material from the bottom surface of the disc is sufficient to cause the dimples to penetrate the bottom surface of the disc, thereby creating holes in the disc, and wherein the resulting fluid handling discs are suitable for aerosolizing a liquid;
   machining the disc via electrochemical machining to remove a layer of material from the bottom surface of the disc; and
   wherein the holes are uniform and have a diameter of less than about 4 µm to allow for the generation of finely atomized aerosol to deliver therapeutic agents and wherein the electrochemical machining removes material from the disc at a higher rate than the electrochemical etching.

2. The method of claim 1, further comprising etching the disc via electrochemical etching to remove a layer of material from the top surface of the disc.

3. The method of claim 1, wherein the disc has an initial height of between 50 and 250 µm.

4. The method of claim 1, wherein the disc is made of stainless steel.

5. The method of claim 1, wherein the electrochemical etching is carried out at constant current.

6. The method of claim 1, wherein the electrochemical etching is carried out in a solution comprising phosphoric acid, sulfuric acid, and water.

7. The method of claim 1, wherein the electrochemical etching is carried out in a solution comprising sodium chloride.

8. The method of claim 1, wherein the electrochemical etching is carried out in a solution comprising sodium nitrate.

9. The method of claim 1, wherein the electrochemical etching is carried out in a solution comprising sodium chloride and sodium nitrate in a ratio from 1:50 to 50:1.

10. The method of claim 1, wherein the dimples are drilled with laser drilling.

11. The method of claim 1, wherein the dimples are drilled with ion/e-beam drilling.

12. The method of claim 1, wherein the dimples are conical.

13. The method of claim 1, wherein 0.5 to 10 microns of material is removed via electrochemical etching.

14. A method for making fluid handling discs as used for drug delivery using mesh nebulizers, comprising:
   providing a fluid handling disc having a top surface and a bottom surface;
   drilling dimples in the top surface of the handling disc, wherein the dimples do not penetrate the bottom surface of the disc, and wherein each dimple has a diameter greatest at the top surface and converges to a smaller diameter at the lowest point of the dimple;
   patterning channels into the fluid handling disc, the channels attaching fluid flow to deliver liquid to be atomized to the dimples and to carry excess fluid from the dimples out of the disc; and
   machining the disc via electrochemical machining to remove a layer of material of material from the bottom surface of the disc, wherein removal of a layer of material from the bottom surface of the disc is sufficient to cause the dimples to penetrate the bottom surface of the disc, thereby creating holes in the disc, and wherein the resulting fluid handling discs are suitable for aerosolizing a liquid;
   etching the disc via electrochemical etching to remove a layer of material from the bottom surface of the disc;
   wherein the holes are uniform and have a diameter of less than about 4 µm to allow for the generation of finely atomized aerosol to deliver therapeutic agents and wherein the electrochemical machining removes material from the disc at a higher rate than the electrochemical etching.

15. The method of claim 14, wherein the step of etching the disc via electrochemical etching removes a layer of material from the top of the disc.

16. The method of claim 14, wherein the disc has an initial height of between 50 and 250 µm.

17. The method of claim 14, wherein the disc is made of stainless steel.

18. The method of claim 15, wherein the electrochemical etching is carried out at constant current.

19. The method of claim 15, wherein the electrochemical etching is carried out in a solution comprising phosphoric acid, sulfuric acid, and water.

20. The method of claim 15, wherein the electrochemical etching is carried out in a solution comprising sodium chloride.

21. The method claim 15, wherein the electrochemical etching is carried out in a solution comprising sodium nitrate.

22. The method of claim 15, wherein the electrochemical etching is carried out in a solution comprising sodium chloride and sodium nitrate in a ratio 1:50 to 50:1.

23. The method of claim 14, wherein the dimples are drilled with laser drilling.

24. The method of claim 14, wherein the dimples are drilled with ion/e-beam drilling.

25. The method of claim 14, wherein the dimples are conical.

26. The method of claim 15, wherein 0.5 to 10 microns of material is removed via electrochemical etching.

* * * * *

UNITED STATES PATENT AND TRADEMARK OFFICE
CERTIFICATE OF CORRECTION

PATENT NO. : 9,303,330 B2
APPLICATION NO. : 13/912678
DATED : April 5, 2016
INVENTOR(S) : Sundararajan et al.

It is certified that error appears in the above-identified patent and that said Letters Patent is hereby corrected as shown below:

Specification

In Column 2, Line 55, delete "layer of material" and insert -- layer --, therefor.

In Column 3, Line 39, delete "diameter. (e.g." and insert -- diameter (e.g. --, therefor.

In Column 5, Line 40, delete "in the a" and insert -- in the --, therefor.

In Column 6, Line 64, delete "to a achieve" and insert -- to achieve --, therefor.

In Column 9, Line 43, delete "FIG" and insert -- FIG. --, therefor.

In Column 11, Line 5, delete "Q=i$^x$t" and insert -- Q=i$^x$t. --, therefor.

In Column 13, Line 2, delete "(a) 965," and insert -- ($\alpha$) 965, --, therefor.

Claims

In Column 13, Line 25, in Claim 1, delete "disc" and insert -- disc, --, therefor.

In Column 14, Line 22, in Claim 14, delete "of material of material" and insert -- of material --, therefor.

In Column 14, Line 51, in Claim 21, delete "method claim" and insert -- method of claim --, therefor.

Signed and Sealed this
Twenty-sixth Day of July, 2016

Michelle K. Lee
*Director of the United States Patent and Trademark Office*